(12) United States Patent
Nakayama

(10) Patent No.: US 12,044,482 B2
(45) Date of Patent: Jul. 23, 2024

(54) HEAT EXCHANGER

(71) Applicant: Nakayama Engineering K.K., Kawaguchi (JP)

(72) Inventor: Junya Nakayama, Kawaguchi (JP)

(73) Assignee: NAKAYAMA ENGINEERING K.K., Saitama (JP)

( * ) Notice: Subject to any disclaimer, the term of this patent is extended or adjusted under 35 U.S.C. 154(b) by 27 days.

(21) Appl. No.: 17/380,045

(22) Filed: Jul. 20, 2021

(65) Prior Publication Data

US 2022/0026157 A1  Jan. 27, 2022

(30) Foreign Application Priority Data

Jul. 22, 2020 (JP) ................. 2020-125425

(51) Int. Cl.
*E04H 15/48* (2006.01)
*F28D 7/08* (2006.01)
*F28D 7/10* (2006.01)
*F28F 1/32* (2006.01)
*F28D 7/00* (2006.01)

(52) U.S. Cl.
CPC ............... *F28D 7/10* (2013.01); *F28D 7/082* (2013.01); *F28F 1/32* (2013.01); *F28D 7/005* (2013.01)

(58) Field of Classification Search
CPC .. F28D 7/10; F28D 7/082; F28D 7/005; F28F 1/32
USPC ........................................................ 135/154
See application file for complete search history.

(56) References Cited

U.S. PATENT DOCUMENTS

| 3,828,570 | A | * | 8/1974 | Stutz | ................. | F25D 21/10 |
| | | | | | | 62/282 |
| 4,197,625 | A | * | 4/1980 | Jahoda | ............... | F28F 1/32 |
| | | | | | | 29/890.047 |
| 4,970,770 | A | * | 11/1990 | Jansson | .............. | F28D 7/08 |
| | | | | | | 29/523 |
| 6,820,685 | B1 | | 11/2004 | Carter et al. | | |
| 2009/0154096 | A1 | * | 6/2009 | Iyengar | ............. | H05K 7/20754 |
| | | | | | | 62/115 |
| 2013/0240177 | A1 | | 9/2013 | Howard et al. | | |

(Continued)

FOREIGN PATENT DOCUMENTS

| CN | 1742188 A | * | 3/2006 |
| DE | 102016100192 A1 | * | 7/2017 |
| GB | 2499574 | | 8/2013 |

(Continued)

OTHER PUBLICATIONS

Nakayama, "Innovative Heat Exchanger Design for R717 and R744 Cascade Refrigeration System", 9$^{th}$ Conference on Ammonia and CO$_2$ Refrigeration Technologies, Sep. 16-17, 2021, Refrigeration Science and Technology Proceedings, pp. 263-270, International Institute of Refrigeration, Ohrid, R. Macedonia.

(Continued)

*Primary Examiner* — Davis D Hwu
(74) *Attorney, Agent, or Firm* — MORI & WARD, LLP

(57) ABSTRACT

A heat exchanger includes a shell to which a secondary heat medium is configured to be supplied and a plate fin coil body provided in the shell. The plate fin coil body includes a plurality of plate fins and a coil which passes through the plurality of plate fins and through which a primary heat medium is configured to flow.

20 Claims, 4 Drawing Sheets

(56) References Cited

U.S. PATENT DOCUMENTS

2014/0120007 A1    5/2014  Valensa

FOREIGN PATENT DOCUMENTS

| JP | 2016-17675 | | 2/2016 |
| JP | 2018-091495 | | 6/2018 |
| JP | 2019078501 | * | 5/2019 |
| WO | WO9747168 A1 | * | 12/1997 |
| WO | WO2018072600 | * | 4/2018 |

OTHER PUBLICATIONS

Extended European Search Report for corresponding EP Application No. 21186937.5-1002, Nov. 26, 2021.
European Office Action for corresponding EP Application No. 21 186 937.5-1002, Mar. 29, 2023.

* cited by examiner

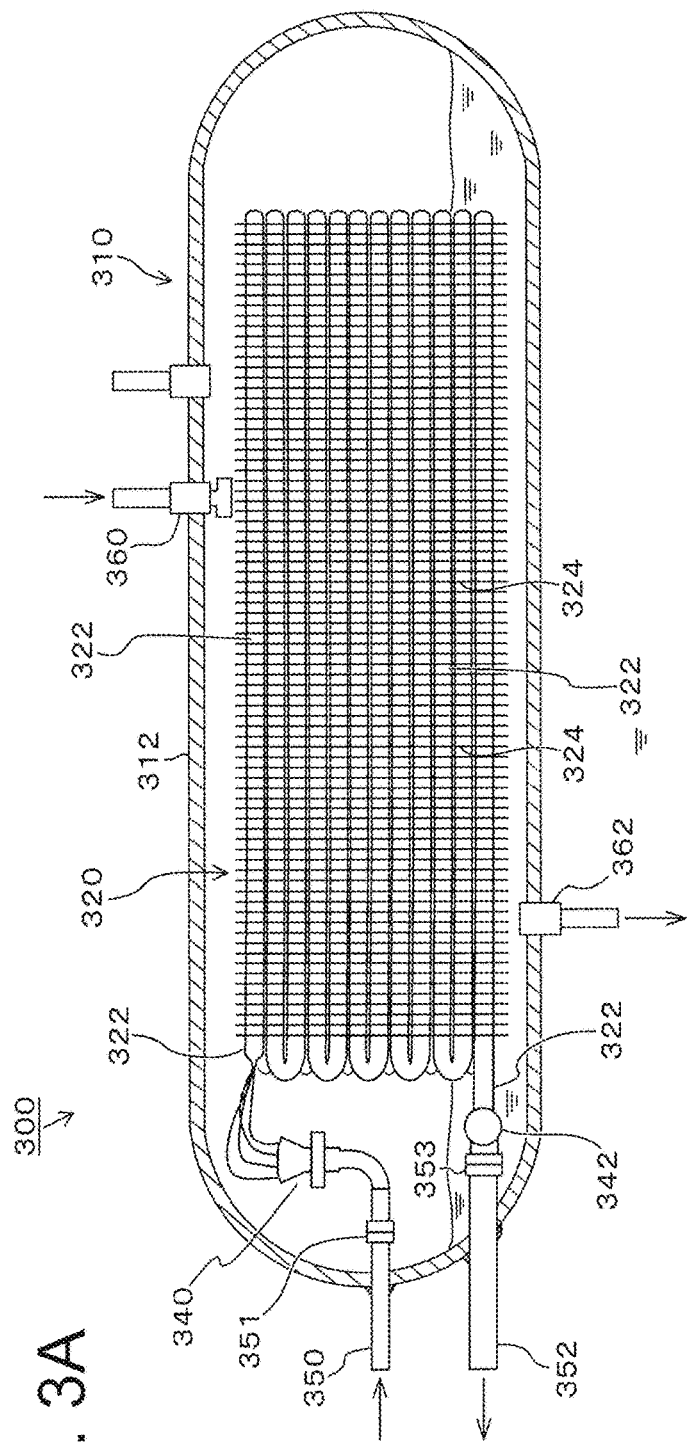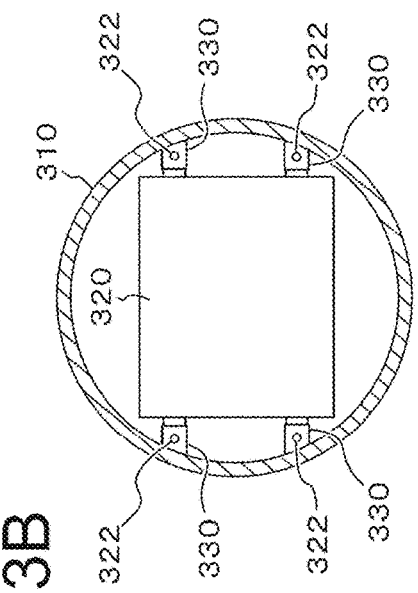

HEAT EXCHANGER

CROSS-REFERENCE TO RELATED APPLICATIONS

The present application claims priority under 35 U.S.C. § 119 to Japanese Patent Application No. 2020-125425, filed Jul. 22, 2020. The contents of this application are incorporated herein by reference in their entirety.

BACKGROUND

Field of the Invention

The present invention relates to a heat exchanger.

Discussion of the Background

Currently, a plate heat exchanger, a shell-and-plate heat exchanger, and a shell-and-tube heat exchanger are used for condensing or reliquefying a low-boiling-point refrigerant or carbon dioxide gas. The plate-type heat exchanger mainly used has a structure in which a plurality of flat plates (plates) is stacked so as to form a gap, a flow path is formed, and heat exchange is performed by alternately flowing a high-temperature gas and a low-temperature fluid. For example, Japanese Unexamined Patent Application Publication. No. 2018-091495 discloses a plate-type heat exchanger that can be used in either vertical or horizontal placement.

SUMMARY

According to one aspect of the present application, a heat exchanger includes a shell to which a secondary heat medium is configured to be supplied and a plate fin coil body provided in the shell. The plate fin coil body includes a plurality of plate fins and a coil which passes through the plurality of plate fins and through which a primary heat medium is configured to flow.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3A is a side view of the main part of the heat exchanger, and FIG. 3B is an end view showing how the plate fin coil body is fixed to the shell.

DESCRIPTION OF THE EMBODIMENTS

Figure 1:
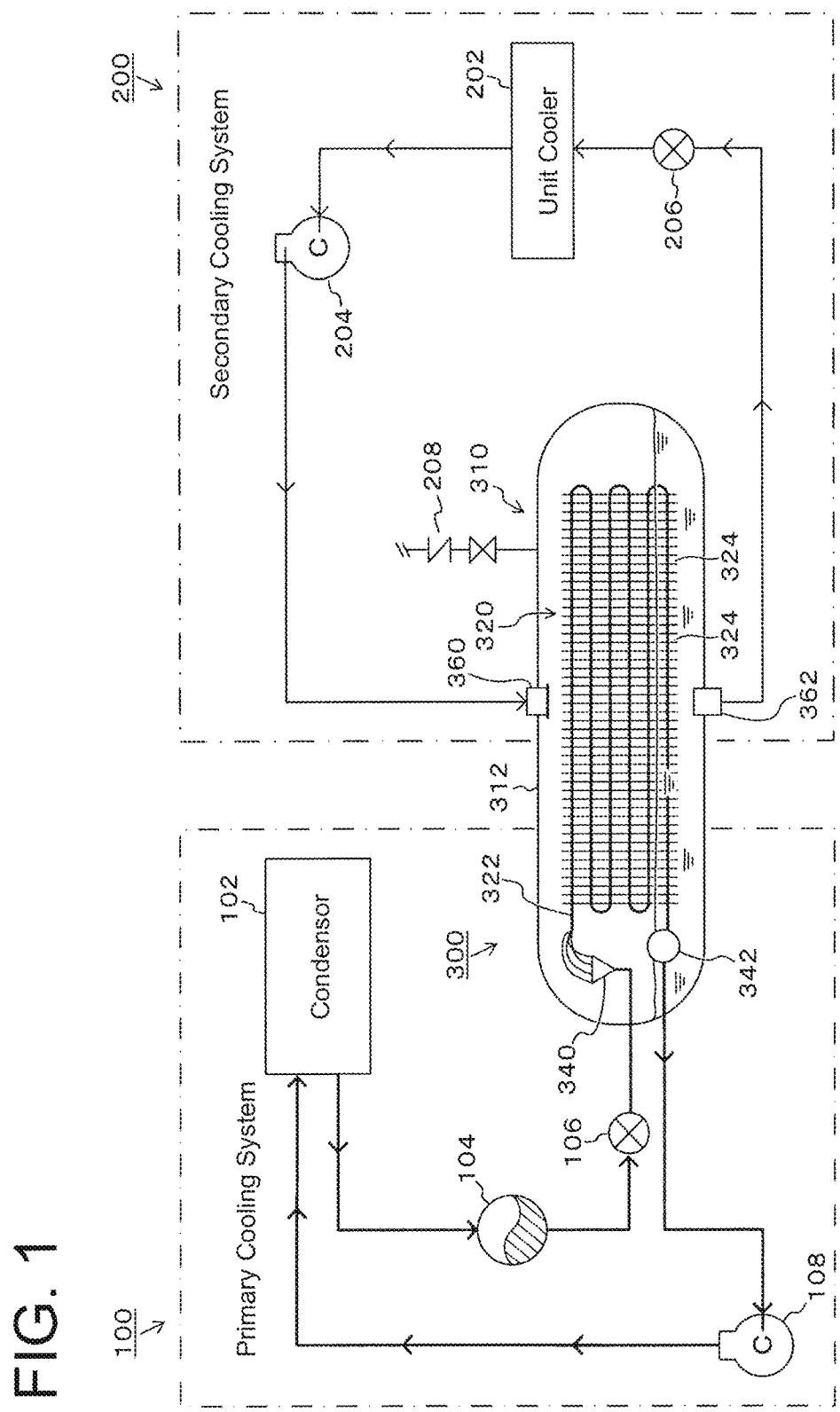
FIG. 1 is a diagram showing an example of a cooling system to which a first embodiment of the present invention is applied.

Hereinafter, embodiments will be described with reference to the drawings. In the drawings, the same reference signs denote corresponding or identical components.

In the plate-type heat exchanger, the medium on the cooling side is introduced into the gap between the flat plates in which a plurality of flow paths is partitioned, but since the medium flows freely between the flat plates that are open, the two-phase flow refrigerant itself does not spread evenly over the heat transfer surface, and inefficient operation is forced. In addition, since the refrigerant passes through the flow path having a small cross-sectional area in a biased manner, there is a risk that liquid return occurs in which the unevaporated refrigerant is sucked into the compressor. In order to prevent this, it is necessary to adjust the flow rate of the refrigerant by using the expansion valve or the flow rate adjusting valve so as to generate a large degree of superheat, and it is difficult to effectively use the heat transfer surface by superheat region on the cooling surface.

In addition, since the shell-and-plate-type heat exchanger is merely disposed inside the shell, it is difficult to control the refrigerant on the cooling side. Further, in the shell-and-tube type, even if the refrigerant on the cooling side is made to flow to the tube side, the refrigerant liquid flows into the tube disposed in the lower portion of the partition space, with the return tube by the path, and the refrigerant liquid does not flow at all into the tube in the upper portion after the intermediate portion, such that inefficient operation is forced.

First Embodiment

A first embodiment of the present invention will be described with reference to FIGS. 1 to 3. FIG. 1 shows an example of a cooling apparatus according to the present invention, which includes a primary cooling system 100 and a secondary cooling system 200. The heat exchanger 300 of the present invention is provided between the primary cooling system 100 and the secondary cooling system 200, whereby heat exchange is performed between the two cooling systems.

First, in the primary cooling system 100, a receiver tank 104 is provided on the delivery side of the primary heat medium of the condenser 102, and an expansion valve 106 is provided on the refrigerant delivery side of the receiver tank 104. A heat exchanger 300 is provided on the refrigerant delivery side of the expansion valve 106. The primary heat medium that has passed through the expansion valve 106 is supplied to the coil 322 of the heat exchanger 300 via the connected distributor 340, and is sent out to the compressor 108 with a change in state or temperature. The primary heat medium discharged from the compressor 108 is supplied to the condenser 102 described above, and the primary heat medium circulates in the primary cooling system 100.

On the other hand, in the secondary cooling system 200, a compressor 204 is provided on the secondary heat medium delivery side of the unit cooler 202, and a heat exchanger 300 is provided on the refrigerant delivery side of the compressor 204. The secondary heat medium supplied from the compressor 204 is supplied to the shell side of the heat exchanger 300 to exchange heat with the primary heat medium. The secondary heat medium after the heat exchange is supplied to the unit cooler 202 via the expansion valve 206, and the secondary heat medium circulates in the secondary cooling system 200.

In the primary cooling system 100, the liquefied primary heat medium in the receiver tank 104 is depressurized by the expansion valve 106 and the distributor 340, and then sent to the coil side of the heat exchanger 300. The primary heat medium heat-exchanged in the heat exchanger 300 is completely gasified, sucked into the compressor 108 and compressed, and then condensed in the condenser 102. The primary heat medium thus liquefied is refluxed to the receiver tank 104. On the other hand, describing the general operation of the secondary cooling system 200, the secondary heat medium liquefied by heat exchange on the shell side of the heat exchanger 300 is depressurized by the expansion valve 206 and then supplied to the unit cooler 202, thereby cooling the inside of the chamber in which the unit cooler 202 is installed. The secondary heat medium having passed through the unit cooler 202 is gasified, sucked into the compressor 204 and compressed, and then sent to the heat exchanger 300 again to be condensed and liquefied.

Figure 2B:
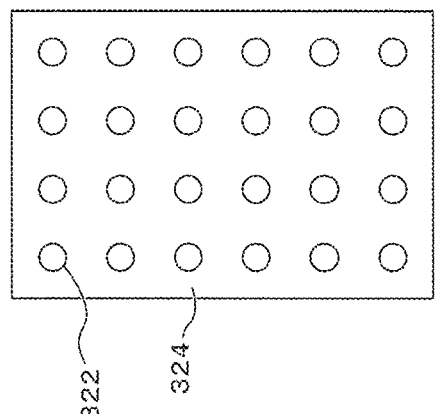
FIG. 2B is a view showing a cross section perpendicular to the longitudinal direction of the plate fin coil body.
Figure 2A:
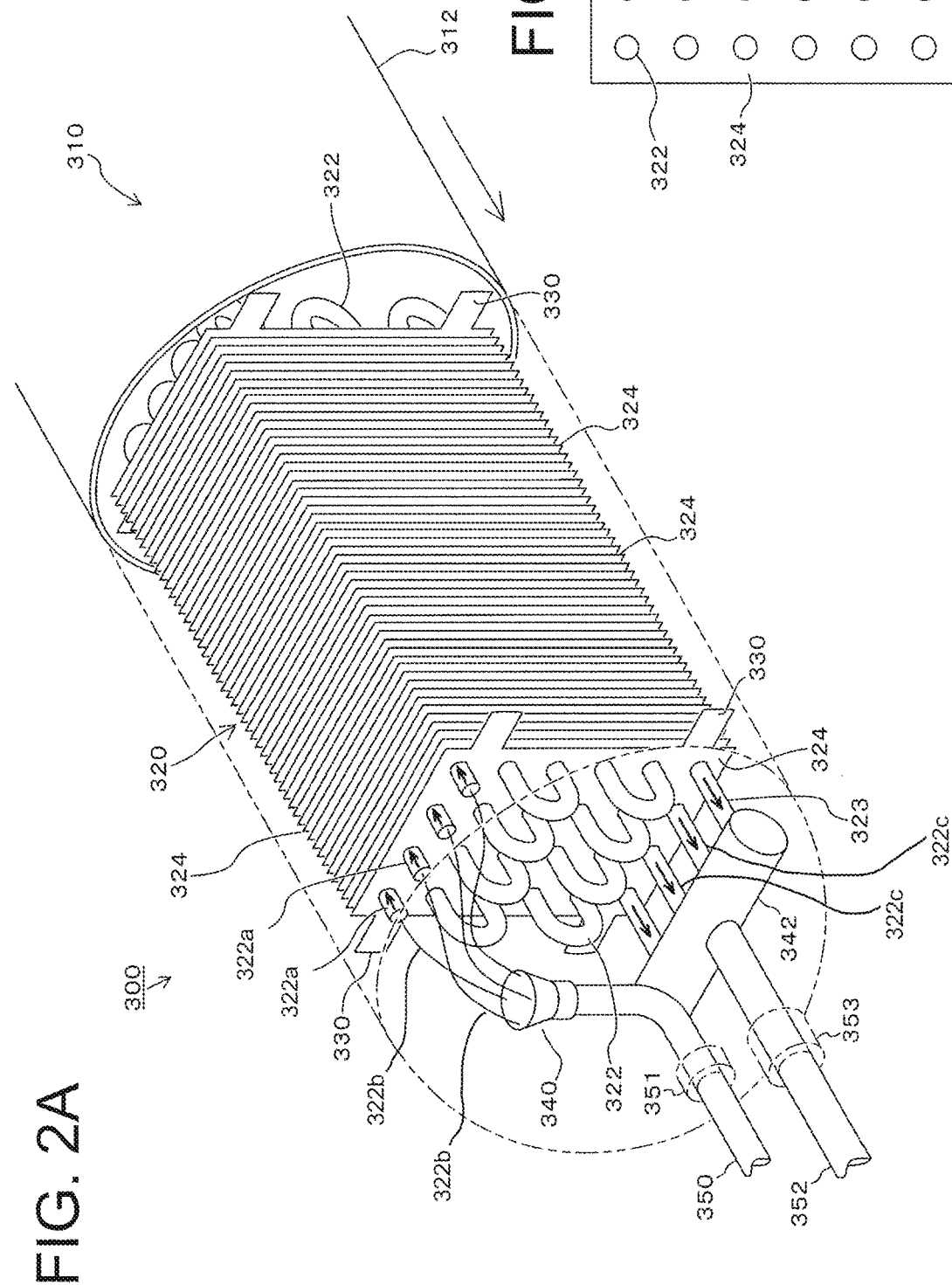
FIG. 2A is a perspective view showing a main part of the first embodiment.

Next, the above-described heat exchanger 300 will be described with reference to FIGS. 2A, 2B, 3A, and 3B. FIGS. 2A and 2B are views showing a main part, and FIGS. 3A and 3B are side views showing the inside. As shown in these figures, the heat exchanger 300 of the present embodiment has a structure in which a plate fin coil body 320 is accommodated in a shell 310.

A plate fin coil body 320 is provided in the cylindrical portion 312 of the shell 310. The plate fin coil body 320 includes a plurality of plate fins 324 and a coil 322 which passes through the plurality of plate fins 324. The primary heat medium is configured to flow through the coil 322. The coil 322 includes a plurality of medium circuits (heat medium passages) 322a. Each of the circuits 322a (heat medium passages) includes a passage inlet 322b and a passage outlet 322c. The primary heat medium flows into the circuits 322a via the passage inlet 322b. The primary heat medium flows out from the circuits 322a via the passage outlet 322c. In the illustrated example, four medium circuits (heat medium passages) 322a are included. By dividing the circuits 322a, capacity reduction due to pressure loss of fluid flowing inside the coil can be minimized. Each circuits 322a has a structure in which it passes through a large number of plate fins 324, whereby the area of heat exchange is increased, and heat exchange is efficiently performed between the primary heat medium in the coil 322 and the secondary heat medium in the shell 310 outside the plate fin coil body 320.

Between the shell 310 and the plate fin coil body 320, an attachment portion 330 is provided, and the plate fin coil body 320 is fixed in the shell 310 by using a bolt and nut means 332 to the attachment portion 330. An inlet 360 for the secondary heat medium is provided in an upper portion of the cylindrical portion 312 of the shell 310, and an outlet 362 is provided in a lower surface side of the cylindrical portion.

Further, in this embodiment, the coil 322 is constituted by a plurality of circuits (heat medium passages) 322a, a distributor (flow divider) 340 is provided at the inlet (an inlet pipe) 350, and the primary heat medium is supplied to the distributor from the expansion valve 106 side through the inlet 350. On the other hand, an outlet of the circuits 322a is connected to a suction header (merging manifold) 342 via a circuit outlet coil 323, and a suction outlet thereof is connected to the outlet (an outlet pipe) 352. The distributor 340 is constituted by a nozzle and a plurality of flow dividing tubes (see, for example, Japanese Patent Application Laid-Open No. 2016-017675), and the primary heat medium introduced from the inlet 350 is equally divided by the distributor 340 and supplied to each circuit of the circuits 322a.

Since the shell 310 serves as a pressure vessel, penetration portions of the inlet 350 and the outlet 352 are welded to each other. Bimetal couplers 351, 353 are provided between the inlet 350 and the distributor 340 and between the outlet 352 and the suction header 342. As will be described later, the bimetal couplers 351, 353 are installed for the purpose of enabling welding at the shell penetration portion by using the same material on the shell side and the pipe side. The inlet 350 side or the outlet 352 side is made of stainless steel, and the opposite side, i. e., the distributor 340 side or the suction header 342 side is made of aluminum.

For example, if the fluid inside the coil 322 is ammonia, a copper coil cannot be used because it produces copper hydroxide. Therefore, as the material of the coil 322, for example, aluminum having excellent heat transfer characteristics is suitable. On the other hand, the pipes constituting the inlet 350 and the outlet 352 connected to the coil 322 need to be sealed at the shell penetration portion. The material of the shell 310 is generally stainless steel or iron, and particularly in the case of stainless steel, aluminum on the pipe side and stainless steel on the shell side are sealed at the shell penetration portion. However, since there is a difference in melting point between aluminum and stainless steel, joining by welding is impossible. Therefore, by providing the bimetal coupler 351, 353 in the shell, the stainless pipe can be joined to the aluminum pipe on the coil side, and the pipe material in the shell penetration portion can be made of stainless. Therefore, the same material can be used in the shell penetration portion and joining by welding can be performed, and the inlet 350 and the outlet 352 can be sealed from the shell 310.

Next, the operation of the above embodiment will be described. In the primary cooling system 100, the primary heat medium decompressed by the expansion valve 106 is introduced into the distributor 340 from the inlet 350 of the heat exchanger 300. The primary heat medium is reduced in pressure to the evaporation pressure by both the expansion valve 106 and the distributor 340, and is further divided equally into the circuits of the coil 322 by the distributor 340. Then, the divided primary heat medium flows in the pipe of the coil 322 in the shell 310, joins at the suction header 342 from the circuit outlet coil 323, and is led out from the outlet 352.

On the other hand, in the secondary cooling system 200, as described above, the secondary heat medium compressed by the compressor 204 is introduced into the shell 310 from the inlet 360 in the upper portion of the shell 310. After the introduction, the secondary heat medium diffuses in the shell 310 and comes into contact with the plate fin 324 (or the coil 322) of the plate fin coil body 320 to cause condensation. As a result, the liquefied secondary heat medium flows down between the plate fins 324 and accumulates as a liquid at the bottom of the shell 310. In this case, if the liquid surface that can be held by the diameter of the shell 310 (the diameter of the cross section perpendicular to the longitudinal direction) is set such that the amount of medium required for system operation is about one row of the lowermost row of the coils 322 immersed in the internal medium liquid surface of the shell 310 during operation (see FIG. 3), the condensate of the secondary heat medium can be supercooled. Therefore, it is possible to further contribute to the refrigeration effect. The secondary heat medium liquefied by heat exchange with the primary heat medium in the coil 322 is led out from the lower outlet 362 and sent to the expansion valve 206.

In this case, in the present embodiment, since the primary heat medium is equally divided by the distributor 340, the inlet temperatures of the tubes in the respective circuits of the coil 322, that is, the evaporation temperatures of the primary heat medium are substantially the same, and the temperature drop due to the pressure loss in the tubes is also substantially uniform. Therefore, heat exchange between the secondary heat medium and the primary heat medium passing through the plate fin coil body 320 is performed substantially uniformly in any circuit of the coil 322.

Further, in the present embodiment, the secondary heat medium mainly contacts the plate fin 324 of the plate fin coil body 320, so that the condensate of the secondary heat medium flows down by the gravity effect. In this case, since a large number of plate fins 324 are provided, an enlarged heat transfer surface with fins is formed, and a heat exchange area is large. Therefore, the heat exchange between the primary heat medium and the secondary heat medium can be performed very favorably and efficiently.

Next, a specific example of this embodiment will be described. For example, heat exchange is performed by the plate fin coil body 320, by:
A) a carbon dioxide gas refrigerant of 50° C. being discharged from a side of the compressor 204 to a side of the stainless steel shell 310; and
B) an ammonia refrigerant, which evaporates at −8° C., flowing from a side of the expansion valve 106 to a side of the coil 322 made of aluminum.

The heat transfer rate in this case enables operation such that a temperature difference (TD) the evaporation temperature of ammonia of the primary medium −8° C. and the carbon dioxide gas condensation temperature of the secondary heat medium −5° C. is about 3° C., because the condensation temperature of the secondary heat medium is −5° C. due to the synergistic effect of the boiling heat transfer inside the coil and the condensation heat transfer occurring outside the fin coil. At this time, the average heat transfer rate of film-like condensation outside the tube of the plate fin coil body 320 is 2583 W/m²·K, and a large heat transfer rate of 1771 W/m²·K can be obtained inside the tube. It is assumed that since the pressure of the carbon dioxide gas on the condensation side is high, the molecular motion is large, and the viscosity is small, droplet condensation occurs in the upper portion of the plate fin coil body 320, and mixed condensation of film condensation occurs in the middle or lower portion. Details will be described later.

In this way, the secondary heat medium introduced into the shell 310 in a vaporized state is favorably condensed and liquefied, and stays on the lower side of the shell 310. Therefore, since the shell 310 itself also serves as the receiver tank of the secondary heat medium, it is possible to omit the receiver tank separately prepared in the conventional system. Further, since a part of the plate fin coil body 320 is immersed in the liquid of the secondary heat medium accumulated at the bottom of the shell 310, the secondary heat medium can be supercooled, and not only the effect of increasing the difference in the specific enthalpy of the carbon dioxide gas as the secondary refrigerant can be obtained, but also direct contact condensation is performed by the contact of the carbon dioxide gas discharged from the compressor 204 with the accumulated and supercooled liquefied carbon dioxide gas.

In addition, by adopting a multi-circuit configuration by the distributor 340 and optimizing the circuit length of the coil 322 of each circuit, it is possible to manufacture the primary heat medium so as to minimize the pressure loss of the primary heat medium passing through the inside thereof. Therefore, the present invention can be used in all industrial applications, and is particularly suitable for industrial applications requiring large cooling/refrigerating capacity.

Second Embodiment

Figure 4:
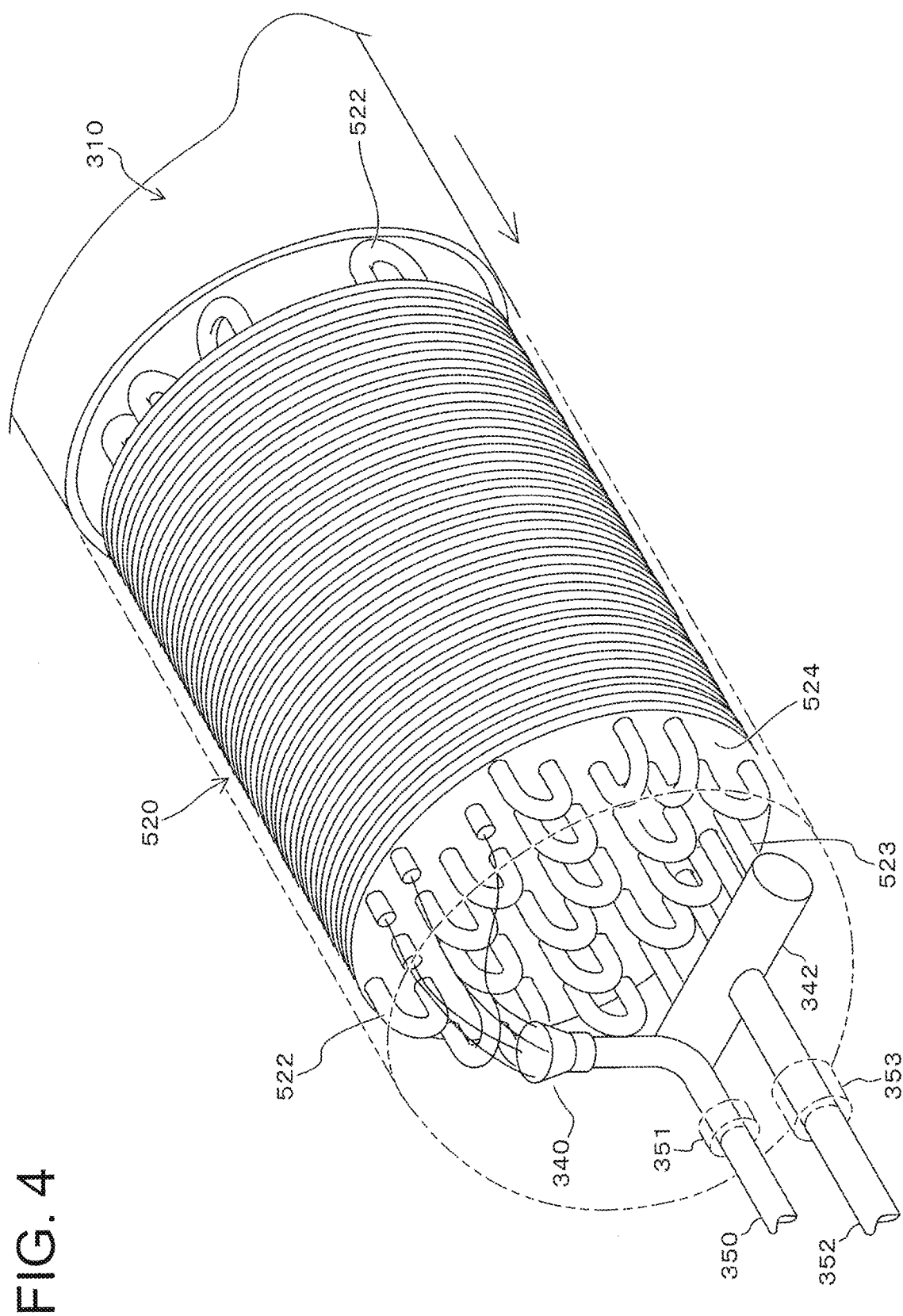
FIG. 4 is a diagram showing a main part of a second embodiment of the present invention.

Next, a second embodiment of the present invention will be described with reference to FIG. 4. In the above-described embodiment, the plate fin 324 of the plate fin coil body 320 is formed in a rectangular shape, but in the present embodiment, as shown in the same figure, the plate fin 524 of the fin coil body 520 is formed in a disk shape, and the coil 522 is provided so as to pass through these. The rest is the same as in the first embodiment described above.

Third Embodiment

Next, a third embodiment of the present invention will be described to show an example of a prototype of the above-described first embodiment. In this prototype, the primary heat medium was ammonia refrigerant, and the secondary heat medium was carbon dioxide gas. Detailed specifications, heat transfer areas of outer surface, side heat transfer coefficient outside tube, and the like of the shell 310 constituting the heat exchanger 300, the coil 322 of the plate fin coil body 320, and the plate fin 324 are shown in the following Tables 1 to 4. In Tables 1 to 4, one continuous table is divided into four for convenience.

TABLE 1

| | Shell and fin coil capacity calculation | | |
|---|---|---|---|
| Shell selection | SUS304TPY 350A Sch40 | | |
| | Shell call (A) | 350 | A |
| | Shell outer diameter | 355.6 | mm |
| | Shell wall thickness | 11.1 | mm |
| | Shell inner diameter | 333.4 | mm |
| | Shell weight | 95.3 | kg/m |
| | Shell copper plate length | 1500 | mm |
| | Weight of shell copper plate alone | 142.95 | kg/m |
| | Shell total internal volume | 131 | L |
| Refrigerant in the shell | Name of refrigerant disposed outside tube | R744 | CO2 |
| | Temperature of refrigerant disposed outside the tube inlet | 50 | ° C. |
| | Temperature of refrigerant disposed outside the tube outlet | −5 | ° C. |
| Refrigerant in the coil | Name of refrigerant disposed inside tube | R717 | NH3 |
| | Temperature of gas disposed inside tube | 30 | ° C. |
| | Evaporation temperature of refrigerant disposed inside tube | −8 | ° C. |
| | Temperature of refrigerant disposed at the tube outlet | −5 | ° C. |

TABLE 1-continued

Shell and fin coil capacity calculation

| | | | | |
|---|---|---|---|---|
| Coil tube details | Tube material | | Aluminum | |
| | Thermal conductivity | $\lambda$ | 236 | w/m · K |
| | Outer diameter | do | 15.88 | mm |
| | Wall thickness | | 1.5 | mm |
| | Inner diameter | | 12.88 | mm |
| | Effective length | L | 1000 | mm |
| | Pitch row | Pp1 | 40 | mm |
| | Pitch stage | Pp2 | 38 | mm |
| Fin detail | Fin material | | Aluminum | |
| | Thermal conductivity | $\lambda$ | 236 | w/m · K |
| | Thickness | tf | 0.15 | mm |
| | Fin contact efficiency | $\eta c$ | 100 | % |

TABLE 2

| | | | | |
|---|---|---|---|---|
| Color height | | tc | 2.85 | mm |
| Pitch | | fp | 3 | mm |
| Number of columns | | nr | 6 | Column |
| Number of stages | | ns | 8 | Stage |
| Arrangement | | | Zigzag | |
| Number | | n | 333 | L/fp |
| Number of circuits | | | 2 | Circuit |
| Length of one circuit | | lL | 24 | m |
| Distributor tube | | | 2 | |
| Heat transfer area of outer surface | | | | |
| Area of tube surface | | Ap | 2.3946476 | m2 | $\pi *do*L*nr*ns$ |
| Area of one side surface of the fin | | Af | 0.0634532 | m2 | $nr*ns*(Pp1*Pp2 - (n*do^2/4))$ |
| Area of thickness surface of the fin | | Az | 0.1196126 | m2 | $\pi *do*nr*ns*n*tf$ |
| Heat transfer area of the outer surface | | A | 44.534899 | m2 | $Ap - Az + 2n*Af$ |
| Heat transfer area of effective inner surface | | Ai | 1.9422582 | m2 | $\pi *di*L*nr*ns$ |
| Heat transfer coefficient outside tube | | | | |
| Membranous condensation of Nusselt | | | CO2 | |
| Fluid temperature | | Tb | 50 | ° C. |
| Temperature of vertical plate | | Tw | -8 | ° C. |
| Film temperature | | tf | 21 | ° C. |
| Specific heat | Liquid | Cp | 4.526 | kJ/kg · K |
| Thermal conductivity | Liquid | $\lambda$ (k) | 0.084511 | W/m · K |
| Density | Liquid | $\rho$ | 762.4 | kg/m3 |
| Density | Vapor | $\rho$ | 202.32 | kg/m3 |
| Gravitational acceleration | | g | 9.80665 | m/s2 |
| Latent heat of evaporation | | $\gamma$ | 146.33 | kJ/kg |
| Height of vertical flat plate | | L | 228 | mm |
| Viscosity | Liquid | $\mu$ | 0.064427 | mPa · s |
| Kinematic viscosity | Liquid | v | 8.451E-08 | cm2/s |
| Average Galilean number | | Gam | 1.628E+13 | $g*L^3/v^2$ |
| Prandtl number | | Pr | 3.4503982 | $Cp*\mu/k$ |
| Sensible heat latent heat ratio | | H | 1.7939452 | $(Cp*(Tb-Tw))/\gamma$ |

TABLE 3

| | | | |
|---|---|---|---|
| Average Nusselt number | Num | 2230.1232 | $(2*2^{0.5}/3)*(Gam*Pr/H)^{0.25}$ |
| Average heat transfer rate of film condensation | ho | 2583.19552 W/m · K | |
| Fin efficiency | | | |
| Schmidt's formula | $\eta f$ | 0.1587028 | $\tanh(((2\alpha a/\lambda *t)^{0.5})*rp*(\phi)/(((2\alpha a/\lambda *0^{0.5})*rp*\Phi)$ |
| Tube radius | rp | 0.00794 m | do/2 |
| | $\rho$ | 2.5626322 | |
| | $\phi$ | 2.0773042 | $(\rho - 1) * (1 + 0.35*\ln \rho)$ |
| Heat transfer rate | $\alpha a$ | 2583.1955 W/m2 · K | |
| Heat transfer area of effective outer surface | Ae | 8.9817918 m2 | $(Ap - \pi *do*nr*ns*n*(tf + tc)) + \eta c(\pi *do*nr*ns* n*tc + 2* \eta f*n*Af)$ |

TABLE 3-continued

| | | | |
|---|---|---|---|
| Fin mounting area | | 2.3922529 m2 | π *do*nr*ns*n*(tf + tc) |
| Collar area | | 2.2726403 m2 | π *do*nr*ns*n*tc |
| Fin efficiency * fin surface area | | 6.7067568 m2 | 2* η f*n*Af |
| Effective heat transfer area ratio | k | 0.2016799 | Ae/A |
| Effective inner/outer area ratio | m | 4.6244066 | Ae/Ai |
| Temperature difference | | 3° C. | |
| Number of tubes | | 2 | |
| Heat transfer coefficient inside tube | NH3 | | |
| Enthalpy | Vapor | 1596.3 kJ/kg | |
| Enthalpy | Liquid | 484.91 kJ/kg | |
| Liquid capacity | $\Delta h$ | 1111.39 kJ/kg | |
| Refrigerant flow rate | qmr | 77.319393 kg/h | |
| Volume | Vapor Vg | 0.387672 m3/kg | |
| Liquid amount | | 0.0214776 kg/s | |
| Flow rate | | 0.0083263 m3/s | |
| Liquid viscosity | Liquid μ | 0.0001255 Pa · s | |
| Thermal conductivity | Liquid λ | 0.47135 W/m · K | |

TABLE 4

| | | | | | |
|---|---|---|---|---|---|
| | Gravitational acceleration | g | 9.80665 | m/s2 | |
| | Reynolds coefficient | Re | 16924.254 | | |
| | Refrigerant heat transfer rate | αr | 26054.881 | W/m2 · K | |
| | Heat transfer rate | K | 1771.151 | W/m2 · K | |
| Capability calculation | Convergence calculation confirmation | | | | |
| | m*K* $\Delta$t | | 24572 | | |
| | (qmr* $\Delta$h)/(3.6* π *di*I) | | 24580 | | |
| Capability | | φ 0 | 47.724 | kW | k*A*K* $\Delta$t |

In the prototype, in the compressor 108 of the primary cooling system 100 for ammonia refrigerant
Evaporation temperature to =−8° C.
Condensation temperature tk=30° C.
The power input is 10.5 kW and the refrigerating capacity $\Phi_O$=47 kW.

In addition, in the compressor 204 of the secondary cooling system 200 of the carbon dioxide gas refrigerant
Evaporation temperature to =−32° C.
Condensation temperature tk=−5° C.
The power input is 7.7 kW and the refrigerating capacity $\Phi_O$=38.4 kW Therefore, although the required condensing capacity Φk of the heat exchanger 300 is 46.1 kW, the polytropic compression is actually performed, and the refrigerating capacity $\Phi_O$ of the compressor 108 of the primary cooling system 100 can be satisfied with $\Phi_O$=47 kW. Also in the operation state of the prototype of the numerical value example described above, a result approximate to the calculated value was obtained. In this way, by installing the coil 322 inside the shell 310 which also serves as the receiver tank, it is possible to simplify the refrigeration system and to reduce the size of the condensing unit. The numerical values of the compressors 108, 204 are calculated by the refrigerating capacity calculation software of the manufacturer of the compressor.

Fourth Embodiment

Next, a fourth embodiment of an example of a prototype of the present invention will be described. In this prototype, carbon dioxide gas (R-744) is used as the primary heat medium, and both the primary heat medium and the secondary heat medium are carbon dioxide gas in a binary refrigeration system (cascade system), as compared with the fourth embodiment. Detailed specifications, outer surface heat transfer areas, heat transfer coefficient outside tube, and the like of the shell 310 constituting the heat exchanger 300, the coil 322 of the plate fin coil body 320, and the plate fin 324 are shown in the following Tables 5 to 8. In Tables 5 to 8, one continuous table is divided into four for convenience.

TABLE 5

| Shell coil capacity calculation | | | |
|---|---|---|---|
| Shell selection SUS304TPY 300A Sch40 | | | |
| Shell call (A) | 300 | A | |
| Shell outer diameter | 318.5 | mm | |
| Shell wall thickness | 10.3 | mm | |
| Shell inner diameter | 297.9 | mm | |
| Shell weight | 79.1 | kg/m | |
| Shell plate length | 1500 | mm | Coil effective length + 500 mm degree |
| Weight of shell plate alone | 118.65 | kg/m | |
| Shell total internal volume | 104.6 | L | |
| Refrigerant in the shell | | | |
| Name of refrigerant disposed outside tube | R744 | CO2 | |
| Temperature of refrigerant disposed outside | | | |

TABLE 5-continued

| Shell coil capacity calculation | | |
|---|---|---|
| the tube inlet | 4° C. | |
| Temperature of refrigerant disposed outside the tube outlet | −5.5° C. | |
| Refrigerant in the coil | | |
| Name of refrigerant disposed inside tube | R744 | CO2 |
| Temperature of gas disposed inside tube | 30° C. | |
| Evaporation temperature of refrigerant disposed inside tube | −8.5° C. | |
| Temperature of refrigerant disposed at the tube outlet | −5° C. | |
| Coil tube details | | |
| Tube material | Copper | |
| Thermal conductivity | λ | 403 w/m · K |
| Outer diameter | do | 12.7 mm |
| Wall thickness | | 1.2 mm |
| Inner diameter | | 10.3 mm |
| Effective length | L | 1000 mm |
| Pitch row | Pp1 | 40 mm |
| Pitch stage | Pp2 | 38 mm |
| Fin detail | | |
| Fin material | Aluminum | |
| Thermal conductivity | λ | 236 w/m · K |
| Thickness | tf | 0.15 mm |
| Fin contact efficiency | η c | 100% |

TABLE 6

| | | | | |
|---|---|---|---|---|
| Color height | tc | 2.85 | mm | |
| Pitch | fp | 3 | mm | |
| Number of columns | nr | 6 | Column | |
| Number of stages | ns | 4 | Stage | |
| Arrangement | | Zigzag | | |
| Number | n | 333 | L/fp | |
| Number of circuits | | 2 | Circuit | |
| Length of one circuit | lL | 12 | m | |
| Distributor tube | | 2 | | |
| Heat transfer area of outer surface | | | | |
| Area of tube surface | Ap | 0.9575574 | m2 | $\pi *do*L*nr*ns$ |
| Area of one side surface of the fin | Af | 0.0334398 | m2 | $nr*ns*(Pp1*Pp2 - (\pi *do^2/4))$ |
| Area of thickness surface of the fin | Az | 0.04783 | m2 | $\pi *do*nr*ns*n*tf$ |
| Heat transfer area of the outer surface | A | 23.180604 | m2 | $Ap-Az + 2n*Af$ |
| Heat transfer area of effective inner surface | Ai | 0.7766017 | m2 | $\pi *di*L*nr*ns$ |
| Heat transfer coefficient outside of tube | | | | |
| Membranous condensation of Nusselt | | CO2 | | |
| Fluid temperature | Tb | 4° C. | | |
| Temperature of vertical plate | Tw | −8.5° C. | | |
| Film temperature | tf | −2.3° C. | | |
| Specific heat | Liquid | Cp l | 2.4758 | kJ/kg · K |
| Thermal conductivity | Liquid | λ (k) | 0.11322 | W/m · K |
| Density | Liquid | ρl | 940.96 | kg/m3 |
| Density | Vapor | ρ v | 90.781 | kg/m3 |
| Gravitational acceleration | | g | 9.80665 | m/s2 |
| Latent heat of evaporation | | γ | 237.7 | kJ/kg |
| Height of vertical flat plate | | L(l) | 152 | mm |
| Viscosity | Liquid | μ | 0.10348 | mPa · s |
| Kinematic viscosity | Liquid | v l (μ) | 1.1E−07 | cm2/s |
| Average Galilean number | | Gam | 2.847E+12 | $g*L^3/ v^2$ |
| Prandtl number | | Pr | 2.2628138 | $Cp*\mu/k$ |
| Sensible heat latent heat ratio | | H | 0.1301956 | $(Cp*(Tb-Tw))/\gamma$ |

TABLE 7

| | | | | | |
|---|---|---|---|---|---|
| Fin efficiency | Average Nusselt number | Num | 2500.5921 | | $(2*2^{\wedge}0.5/3)*(Gam*Pr/H)^{\wedge}0.25$ |
| | Average heat transfer rate of film condensation | ho | 7760.8836 | | $W/m2 \cdot K$ |
| | Schmidt's formula | η f | 0.1144873 | | $tanh(B*rp*(\phi))/(B*rp*\phi)$ |
| | Tube radius | rp | 0.00635 | m | do/2 |
| | | ρ | 2.5626322 | | |
| | | φ | 2.0773042 | | $(\rho - 1)*(1 + 0.35*ln\rho)$ |
| | Heat transfer rate Effective outer surface Heat transfer area | α a | 7760.8836 | $W/m2 \cdot K$ | |
| | Ae | | 3.4594593 | m2 | $(Ap - \pi*do*nr*ns*n*(tf + tc)) + \eta c(\pi*do*nr*ns*n*tc + 2*\eta f*n*Af)$ |
| | Fin mounting area | | 0.9565999 | m2 | $\pi *do*nr*ns*n*(tf + tc)$ |
| | Collar area | | 0.9087699 | m2 | $\pi *do*nr*ns*n*tc$ |
| | Fin efficiency * fin surface area | | 2.5497318 | m2 | $2* \eta f*n*Af$ |
| | Effective heat transfer area ratio | | | | |
| | Effective inner/outer area ratio | k | 0.1492394 | | Ae/A |
| | m | | 4.454612 | | Ae/Ai |
| | Temperature difference | ⊿t | 3 | ° C. | |
| | Number of tubes | | 2 | | |
| | Heat transfer coefficient inside of tube CO2 | | | | |
| | Enthalpy | Vapor | 434.68 | kJ/kg | |
| | Enthalpy | Liquid | 304.55 | kJ/kg | |
| | Liquid capacity | ⊿h | 130.13 | kJ/kg | |
| | Refrigerant flow rate | qmr | 707.93822 | kg/h | |
| | Volume | Vapor Vg | 0.0133975 | m3/kg | |
| | Liquid amount | | 0.1966495 | kg/s | |
| | Flow rate | | 0.0026346 | m3/s | |
| | Liquid viscosity | Liquid μ l | 4.377E-05 | Pa · s | |
| | W/m | | | | |
| | Thermal conductivity | Liquid λ l | 0.095356 | K | |

TABLE 8

| | | | |
|---|---|---|---|
| Gravitational acceleration | g | 9.80665 | m/s2 |
| Reynolds coefficient | Re | 555404.06 | |
| Refrigerant heat transfer rate | αr | 60209.947 | $W/m2 \cdot K$ |
| Heat transfer rate | K | 4930.0923 | $W/m2 \cdot K$ |
| Capability calculation | | | |
| Convergence calculation confirmation | | | |
| m*K* ⊿t | | 65885 | |
| (qmr* ⊿h)/(3.6*π *di*l) | | 65903 | |
| Capability | φ0 | 51.166361 kW | k*A*K*⊿t |

In the prototype, in the compressor 108 of the primary cooling system 100 of the carbon dioxide gas refrigerant Evaporation temperature to =−8.5° C.
Gas temperature tk=30° C.
The power input is 19.8 kW and the refrigerating capacity $\Phi_O$=47.8 kW In addition, in the compressor 204 of the secondary cooling system 200 of the carbon dioxide gas refrigerant Evaporation temperature to =−32° C.
Condensation temperature tk=−5.5° C.
The power input is 7.8 kW and the refrigerating capacity $\Phi_O$=37.8 kW Therefore, although the required condensing capacity Φk of the heat exchanger 300 is 45.6 kW, the polytropic compression is actually performed, and the refrigerating capacity $\Phi_O$ of the compressor 108 of the primary cooling system 100 can be satisfied at 47.8 kW. At this time, the carbon dioxide gas of the primary cooling system 100 was similar to the calculated value even in the operation state of the prototype of the numerical example described above. The calculated value uses another spreadsheet formula, and the calculated result is the condensation capacity of 51.2 kW. Therefore, it can be said that the capacity value in the shell-and-fin coil is also satisfied. In this way, by installing the coil 322 inside the shell 310 which also serves as the receiver tank, it is possible to simplify the refrigeration system and to reduce the size of the condensing unit. The numerical values of the compressors 108, 204 are calculated by the refrigerating capacity calculation software of the compressor manufacturer.

OTHER EMBODIMENTS

The present invention is not limited to the above-described embodiments, and various modifications can be made without departing from the scope of the present invention. For example, the following are also included.

(1) The number of the coils and the plate fins shown in the above-described embodiment and the arrangement interval and the fin pitch may be appropriately set. The tube diameter of the coil and the number of circuits can also be made into multiple circuits so as to have an optimum circuit length in consideration of the pressure loss due to the fluid characteristics in the tube. As the plate fin coil body, various types are known, and any type may be used. In addition, baffle plates may be provided at appropriate intervals between the plate fins to prevent deflection due to the coil length and support the plate fin coil body with respect to the cylindrical portion of the shell.

(2) When the secondary heat medium is cooled by the primary heat medium, preferred examples of the primary heat medium include ammonia, carbon dioxide gas, propane gas, water, HFC refrigerant, HFC/HFO refrigerant, and the like, and preferred examples of the secondary heat medium include carbon dioxide gas, ethylene gas, ethane gas, nitrous oxide, water vapor, air, and HFC/HFO refrigerant.

(3) In the above-described embodiment, the coil is constituted by multiple circuits, but in the case of a small-sized condensing unit having a small refrigerating capacity, if the total length of the coil is about 20 m, the coil can be constituted by a single circuit without dividing the circuit of the coil. In the case of a single circuit, the controllability of the expansion valve 106 can be improved by providing a tube for pressure drop instead of the distributor.

(4) In the above embodiment, when the primary heat medium is carbon dioxide gas and is supplied to the coil 322 in a critical state, the carbon dioxide gas in a critical state passes through the nozzles and tubes of the expansion valve 106 and the distributor 340. Then, when the pressure is reduced by the throttle of the expansion valve 106 and passes through the nozzle of the distributor 340 and the narrow tube of the tube, pressure reduction due to friction loss with large gravitational acceleration causes liquefaction. In this way, the specific enthalpy component of the dryness is liquefied by the supply temperature of the critical gas, and the gas that is not liquefied is also cooled, whereby it is possible to perform cooling and condensation of the secondary side refrigerant while preventing a decrease in refrigeration capacity. That is, it is possible to realize a stable operation in the critical state only by performing the superheat degree control based on the superheat temperature obtained from the saturation temperature corresponding to the pressure by the expansion valve 106 and the actually measured temperature with respect to the carbon dioxide gas supplied in the critical state.

It should be noted that, in the present application, "comprise" and its derivatives are non-limiting terms describing the presence of a component and do not exclude the presence of other components not described. This also applies to "have", "include" and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

Furthermore, the expression "at least one of A and B" in the present disclosure encompasses, for example, all of (1) only A, (2) only B, and (3) both A and B. The expression "at least one of A, B, and C" encompasses, for example, all of (1) only A, (2) only B, (3) only C, (4) A and B, (5) B and C, (6) A and C, and (7) all of A, B, and C. In the present disclosure, the expression "at least one of A and B" is not interpreted as "at least one of A and at least one of B."

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A heat exchanger comprising:
 a shell to which a secondary heat medium is configured to be supplied from an outside of the shell via a closed circulation loop and from which the secondary heat medium is configured to be discharged to the outside of the shell to the closed circulation loop, the shell is an airtight sealed shell with a capacity to function as a pressure vessel in conjunction with the closed circulation loop; and
 a plate fin coil body provided in the shell and comprising:
   a plurality of plate fins; and
   a coil which passes through the plurality of plate fins and through which a primary heat medium is configured to flow,
 wherein the secondary heat medium is configured to be compressed by a compressor along the closed circulation loop and configured to be supplied to the shell as a compressed heat medium.

2. The heat exchanger according to claim 1, wherein the coil includes a plurality of heat medium passages each of which includes a passage inlet via which the primary heat medium flows into the plurality of heat medium passages and each of which includes a passage outlet via which the primary heat medium flows out from the plurality of heat medium passages.

3. The heat exchanger according to claim 2, further comprising:
 a distributor connected to the passage inlet of each of the plurality of heat medium passages; and
 a merging manifold connected to the passage outlet of each of the plurality of heat medium passages.

4. The heat exchanger according to claim 3, wherein the distributor and the merging manifold are provided in the shell.

5. A heat exchanger comprising:
 a shell to which a secondary heat medium is configured to be supplied from an outside of the shell via a closed circulation loop and from which the secondary heat medium is configured to be discharged to the outside of the shell to the closed circulation loop, the shell is an airtight sealed shell with a capacity to function as a pressure vessel in conjunction with the closed circulation loop; and
 a plate fin coil body provided in the shell and comprising:
   a plurality of plate fins; and
   a coil which passes through the plurality of plate fins and through which a primary heat medium is configured to flow,
 wherein the coil includes a plurality of heat medium passages each of which includes a passage inlet via which the primary heat medium flows into the plurality of heat medium passages and each of which includes a passage outlet via which the primary heat medium flows out from the plurality of heat medium passages, and
 wherein the plurality of heat medium passages are provided such that an inlet pipe through which the primary heat medium flows into the coil is branched to the plurality of heat medium passages and such that the plurality of heat medium passages merges into the outlet pipe through which the primary heat medium flows out from the coil.

6. A heat exchanger comprising:
a shell to which a secondary heat medium is configured to be supplied from an outside of the shell and from which the secondary heat medium is configured to be discharged to the outside of the shell; and
a plate fin coil body provided in the shell and comprising:
   a plurality of plate fins; and
   a coil which passes through the plurality of plate fins and through which a primary heat medium is configured to flow,
wherein the secondary heat medium is cooled and condensed in the shell by the primary heat medium via a boiling heat transfer.

7. The heat exchanger according to claim 6, wherein the shell is configured to store the secondary heat medium in a liquid state in the shell.

8. The heat exchanger according to claim 2, wherein the secondary heat medium is cooled and condensed in the shell by the primary heat medium via a boiling heat transfer.

9. The heat exchanger according to claim 3, wherein the secondary heat medium is cooled and condensed in the shell by the primary heat medium via a boiling heat transfer.

10. The heat exchanger according to claim 4, wherein the secondary heat medium is cooled and condensed in the shell by the primary heat medium via a boiling heat transfer.

11. The heat exchanger according to claim 5, wherein the secondary heat medium is cooled and condensed in the shell by the primary heat medium via a boiling heat transfer.

12. The heat exchanger according to claim 3, wherein the shell is configured to store the secondary heat medium in a liquid state in the shell.

13. The heat exchanger according to claim 4, wherein the shell is configured to store the secondary heat medium in a liquid state in the shell.

14. The heat exchanger according to claim 5, wherein the shell is configured to store the secondary heat medium in a liquid state in the shell.

15. The heat exchanger according to claim 6, wherein the shell is configured to store the secondary heat medium in a liquid state in the shell.

16. The heat exchanger according to claim 1, wherein the secondary heat medium is configured to circulate in a refrigeration system via the closed circulation loop.

17. The heat exchanger according to claim 5, wherein the secondary heat medium is configured to be compressed by a compressor provided in the refrigeration system and configured to be supplied to the shell as a compressed heat medium.

18. The heat exchanger according to claim 1, wherein the secondary heat medium is configured to flow over the plurality of plate fins and over an outside of the coil when the secondary heat medium flows within the shell.

19. The heat exchanger according to claim 1, wherein the shell is configured as the airtight sealed shell both during operation of the heat exchanger and during non-operation of the heat exchanger.

20. The heat exchanger according to claim 1, wherein the airtight sealed shell has the capacity to function as the pressure vessel in conjunction with the closed circulation loop at a pressure above atmospheric pressure.

\* \* \* \* \*